(12) United States Patent
Ikeda et al.

(10) Patent No.: US 7,055,894 B2
(45) Date of Patent: Jun. 6, 2006

(54) VEHICULAR HOOD STRUCTURE

(75) Inventors: Koki Ikeda, Aichi-ken (JP); Hideki Ishitobi, Tokyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/929,382

(22) Filed: Aug. 31, 2004

(65) Prior Publication Data

US 2005/0082874 A1 Apr. 21, 2005

(30) Foreign Application Priority Data

Sep. 1, 2003 (JP) .............................. 2003-308868

(51) Int. Cl.
*B60K 7/00* (2006.01)
(52) U.S. Cl. .............................. 296/187.09; 296/193.11
(58) Field of Classification Search ........... 296/187.09, 296/193.11, 187.04; 180/69.2, 69.21
See application file for complete search history.

(56) References Cited

U.S. PATENT DOCUMENTS

| | | | | |
|---|---|---|---|---|
| 5,046,768 | A * | 9/1991 | Myslicki | 292/68 |
| 5,833,024 | A * | 11/1998 | Kaneko | 180/69.2 |
| 6,179,364 | B1 * | 1/2001 | Takahashi | 296/76 |
| 6,938,715 | B1 * | 9/2005 | Hamada et al. | 180/274 |
| 2005/0001453 | A1 * | 1/2005 | Endo et al. | 296/193.11 |
| 2005/0082875 | A1 * | 4/2005 | Ikeda et al. | 296/193.11 |
| 2005/0088016 | A1 * | 4/2005 | Ito et al. | 296/193.11 |

FOREIGN PATENT DOCUMENTS

| | | | |
|---|---|---|---|
| JP | 04262977 A * | 9/1992 | |
| JP | 08-276877 | 10/1996 | |
| JP | 08-303073 | 11/1996 | |
| JP | 11-321714 | 11/1999 | |
| JP | 2000001182 A * | 1/2000 | |
| JP | 2002019638 A * | 1/2002 | |
| JP | 2002-037129 | 2/2002 | |
| JP | 2002-087327 | 3/2002 | |
| JP | 2002-337743 | 11/2002 | |
| JP | 2003212154 A * | 7/2003 | |
| JP | 2005075176 A * | 3/2005 | |
| JP | 2005119512 A * | 5/2005 | |
| JP | 2005125831 A * | 5/2005 | |

OTHER PUBLICATIONS

European Search Report dated Dec. 13, 2005.

* cited by examiner

*Primary Examiner*—Kiran B. Patel
(74) *Attorney, Agent, or Firm*—Finnegan, Henderson, Farabow, Garrett & Dunner, LLP

(57) ABSTRACT

A front side bead is formed in a front portion of a vehicular hood (bonnet) along a vehicle width direction by a hood inner panel and a lock reinforcement. A rear-side attachment portion of the hood inner panel to which is joined a flange serves as a swollen portion that swells downward with respect to the vehicle body. The flange of the lock reinforcement has a vehicle body rear-side attachment portion and is largely separated from a hood outer panel in a vehicle body vertical direction.

10 Claims, 14 Drawing Sheets

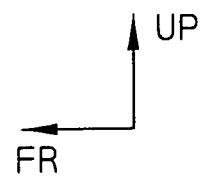
FIG.4
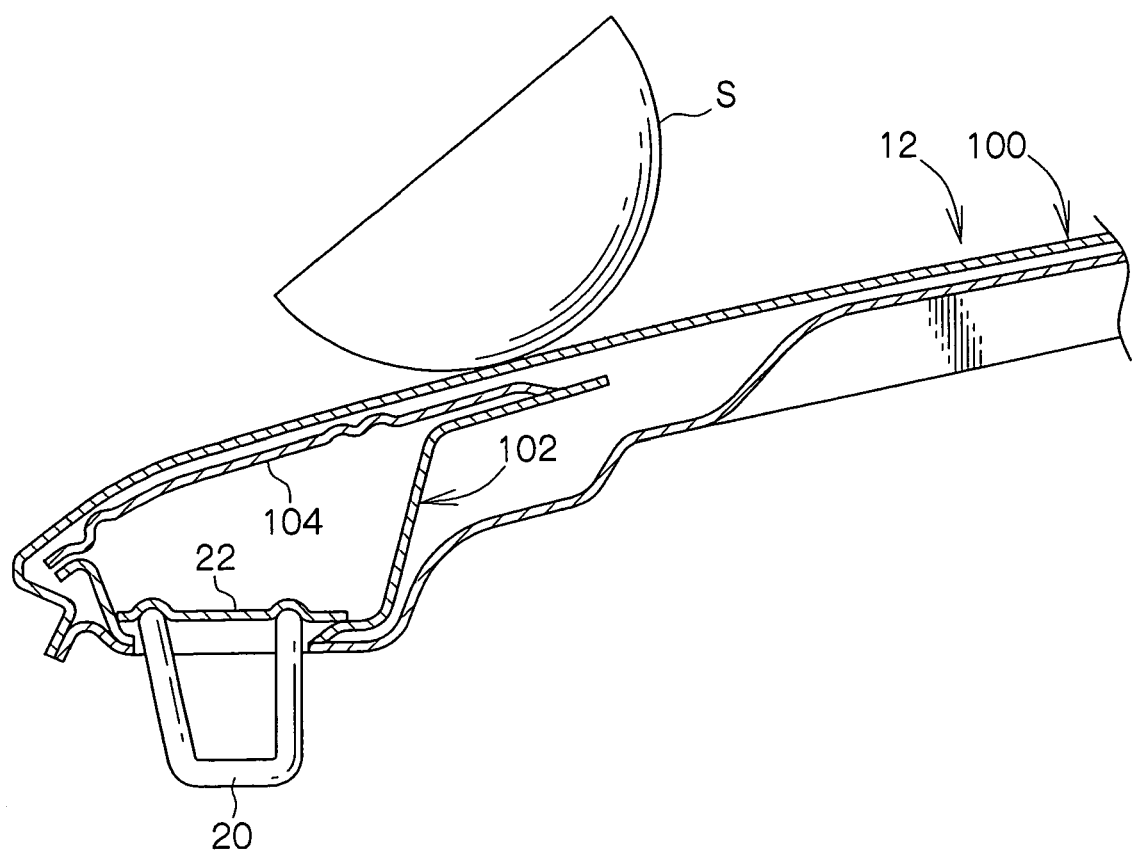

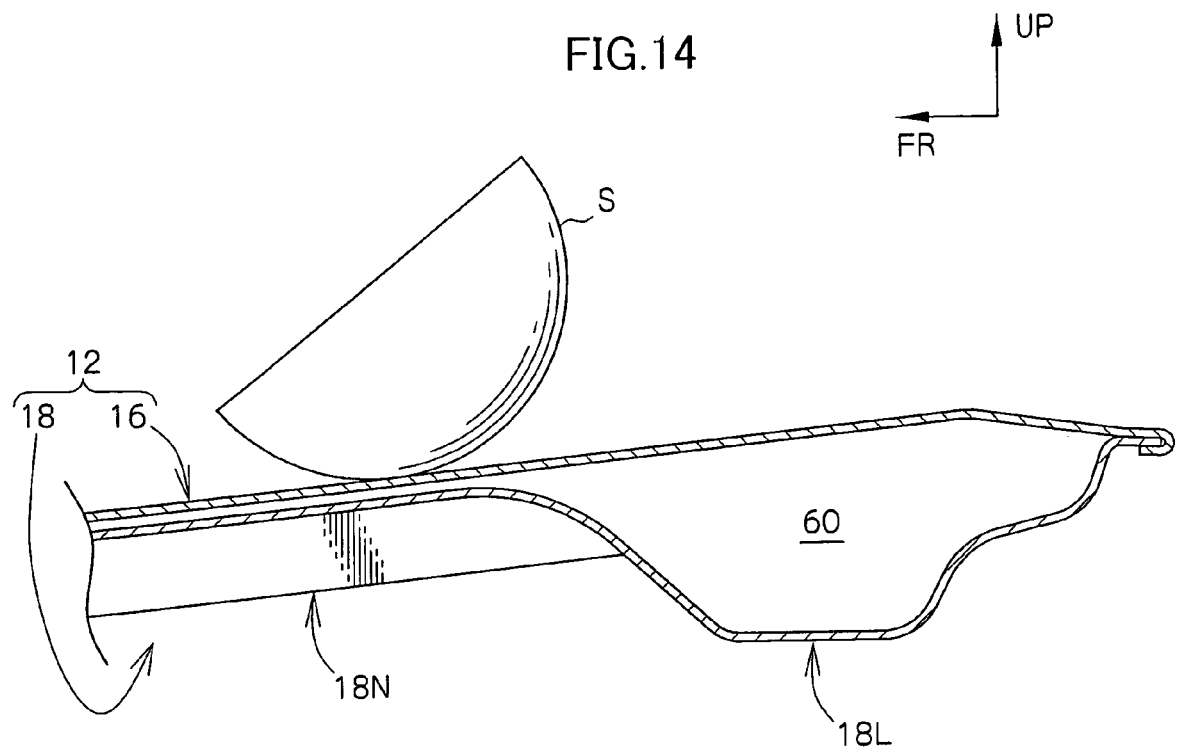

VEHICULAR HOOD STRUCTURE

CROSS-REFERENCE TO RELATED APPLICATION

This application claims priority under 35 USC 119 from Japanese Patent Application No. 2003-308868, the disclosure of which is incorporated by reference herein.

BACKGROUND OF THE INVENTION

1. Field of the Invention

The present invention relates to a vehicular hood (bonnet) structure, and in particular to a vehicular hood structure applied to a vehicle such as an automobile.

2. Description of the Related Art

Conventionally, with respect to a vehicular hood structure applied to a vehicle such as an automobile, a configuration is known where a reinforcement panel folded in a trapezoidal shape by a front slanted panel, a top panel and a rear slanted panel is attached to the site of a hood inner panel disposed with a lock reinforcement, the top panel is divided into a front top panel and a rear top panel by a slit, and edge reinforcement members that reinforce the edges of the front top panel and the rear top panel are attached to the front top panel and the rear top panel, whereby hood rigidity is secured and the shock of a collision body is alleviated (e.g., see Japanese Patent Application Laid-Open Publication (JP-A) No. 11-321714). A configuration is also known where a reinforcement panel is adhered to the site of an undersurface side of a hood outer panel above the lock reinforcement, whereby safety at the time of a collision is improved (e.g., see JP-A No. 2002-37129.

In these vehicular hood structures, the number of parts increases because the reinforcement panel is necessary.

SUMMARY OF THE INVENTION

In consideration of the above-described facts, a structure for use as a vehicular hood is demanded with which hood rigidity can be secured and which can alleviate the shock of a collision body without increasing the number of parts.

An aspect of the invention is a vehicular hood structure. This hood structure includes: a lock reinforcement that is disposed at a lower surface side of a hood inner panel at a predetermined interval away from the hood inner panel and which forms a closed cross-sectional structure with the hood inner panel; and a rear-side attachment portion that is formed in the hood inner panel and to which is fixed a vehicle body rear-side attachment portion of the lock reinforcement. The rear-side attachment portion of the hood inner panel forms a swollen portion that swells further downward with respect to the vehicle body than other sites of the hood inner panel. Moreover, the lock reinforcement is largely separated from the hood inner panel.

Thus, the rigidity of the hood can be secured by the closed cross-sectional structure formed by the hood inner panel and the lock reinforcement. Also, the rear-side attachment portion of the hood inner panel to which is fixed the vehicle body rear-side attachment portion of the lock reinforcement serves as the swollen portion that swells further downward with respect to the vehicle body than other sites of the hood inner panel, and the lock reinforcement is largely separated from the hood inner panel. Thus, when a collision body collides with the hood from above the lock reinforcement, the hood inner panel is largely deformed downwardly with respect to the vehicle body without interfering with the lock reinforcement. As a result, the hood is deformed and the shock of the collision body can be alleviated without generating an excessive reaction force at the early stage of the collision. Moreover, because a separate reinforcement panel is not used, the rigidity of the hood can be secured and the shock of the collision body can be alleviated without increasing the number of parts.

The vehicular hood structure of the invention may further include a cut-and-raised portion that is formed in part of the rear-side attachment portion of the hood inner panel and is joined to a hood outer panel.

The number of joints between the hood inner panel and the hood outer panel is increased by the cut-and-raised portion that is formed in part of the rear-side attachment portion of the hood inner panel and is joined to the hood outer panel. The torsional rigidity of the hood can also be improved.

In the vehicular hood structure of the invention, a stepped portion may be formed in the rear-side attachment portion of the hood inner panel.

Due to the stepped portion formed in the rear-side attachment portion of the hood inner panel, the stepped portion is locally deformed when a collision body collides with the hood at a site further rearward than the rear-side attachment portion of the hood inner panel. As a result, the performance with respect to alleviating the shock of the collision body is further improved because the influence of the lock reinforcement can be alleviated when the site of the hood at which the collision body has collided is deformed.

In the vehicular hood structure of the invention, a distance in a front-rear direction between the rear-side attachment portion of the hood inner panel and a hood lock striker may be set to be at least twice a distance in a vertical direction between the hood inner panel and the hood lock striker.

When the distance in the front-rear direction between the rear-side attachment portion of the hood inner panel and the hood lock striker is set to be at least twice the distance in the vertical direction between the hood inner panel and the hood lock striker, the site at which the collision body has collided easily rotates downward starting at the rear-side attachment portion when a collision body strikes the hood from above the hood lock striker. Thus, the performance with respect to alleviating the shock of the collision body is further improved.

In the vehicular hood structure of the invention, the rear-side attachment portion of the hood inner panel serves as the swollen portion that swells further downward with respect to the vehicle body than other sites of the hood inner panel, and the lock reinforcement is largely separated from the hood inner panel. Thus, the rigidity of the hood can be secured and the shock of a collision body can be alleviated without increasing the number of parts.

The torsional rigidity of the hood is improved even if the vehicular hood structure includes a cut-and-raised portion that is formed in part of the rear-side attachment portion of the hood inner panel and is joined to the hood outer panel.

The shock alleviating performance is further improved even if a stepped portion is formed in the rear-side attachment portion in the vehicular hood structure.

The shock alleviating performance is further improved even if the distance in the front-rear direction between the rear-side attachment portion of the hood inner panel and the hood lock striker is set to be at least twice the distance in the vertical direction between the hood inner panel and the hood lock striker.

BRIEF DESCRIPTION OF THE DRAWINGS

FIG. 4 is a cross-sectional view corresponding to FIG. 1 showing a vehicular hood structure pertaining to a comparative example of the first embodiment of the invention;

FIG. 14 is a side cross-sectional view showing a hood rear end portion of a vehicular hood structure pertaining to another embodiment of the invention.

DETAILED DESCRIPTION OF THE INVENTION

Figure 1:
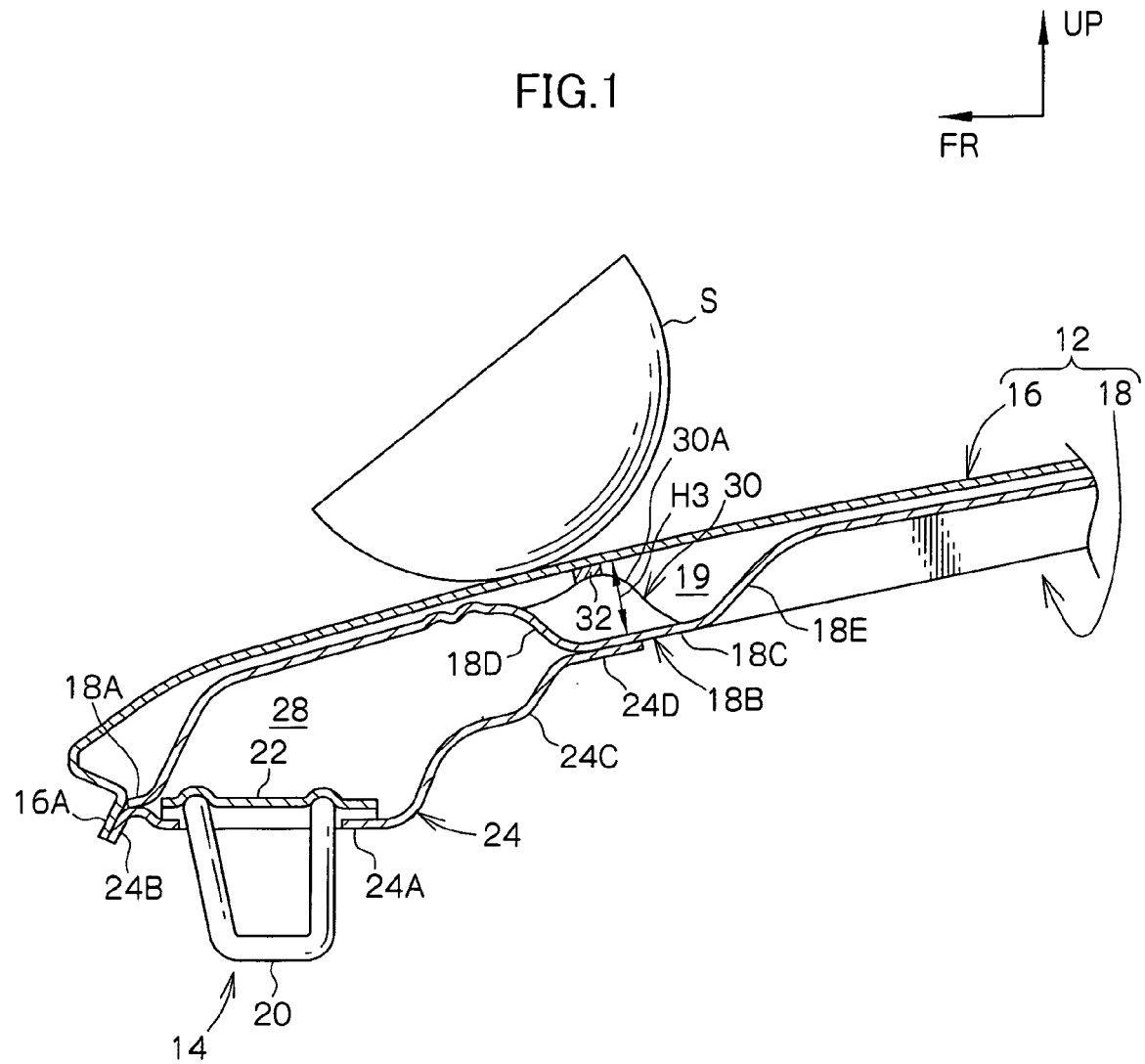
FIG. 1 is a side cross-sectional view showing a vehicular hood structure pertaining to a first embodiment of the invention.

A first embodiment of a vehicular hood structure of the invention will be described in accordance with FIGS. 1 to 3.

In the drawings, the UP arrow represents a vehicle body up direction, and the FR arrow represents a vehicle body front direction.

Figure 2:
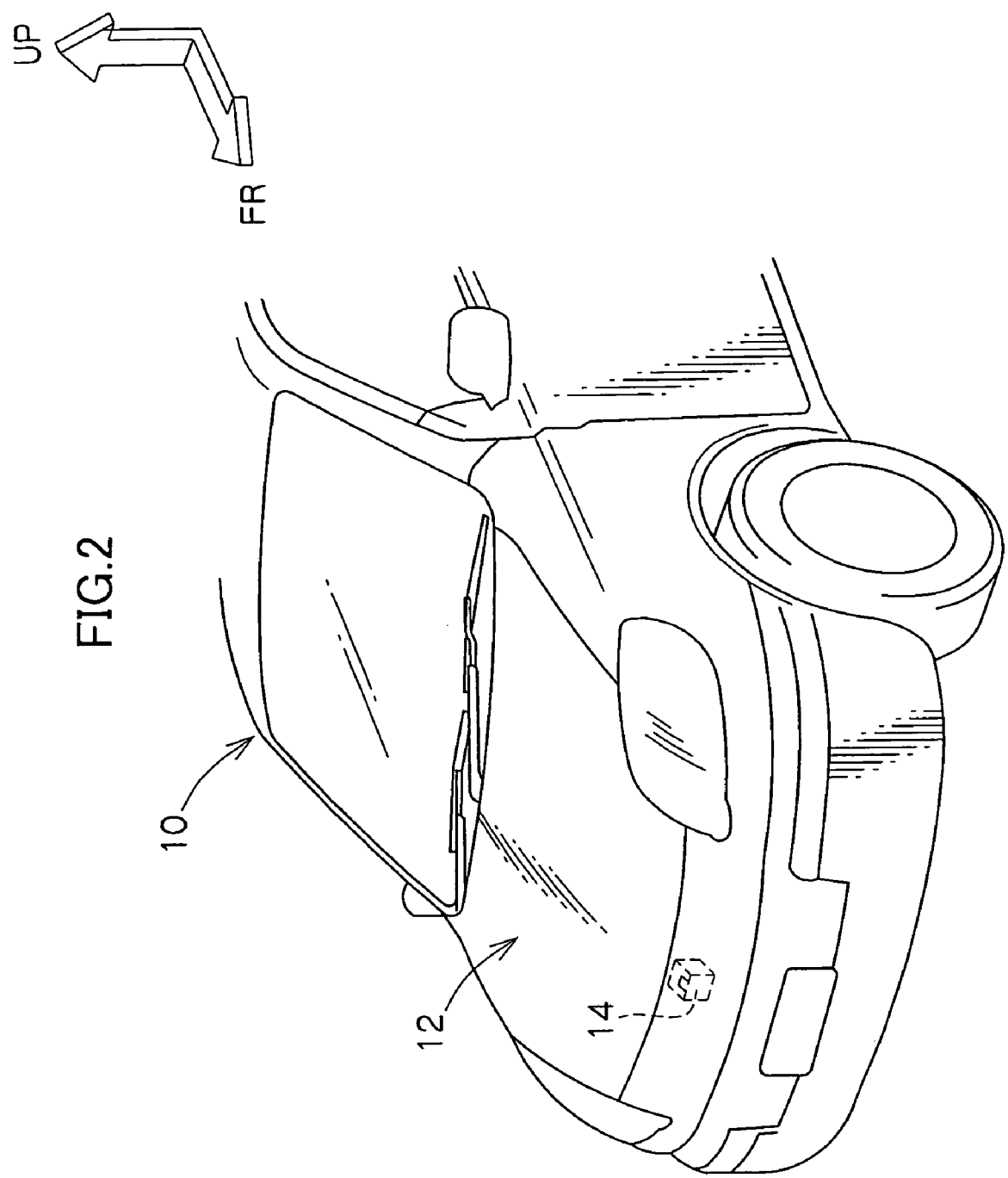
FIG. 2 is a perspective view, seen diagonally from the front of a vehicle body, showing a vehicle body to which the vehicular hood structure pertaining to the first embodiment of the invention has been applied.

As shown in FIG. 2, in the present embodiment, a known hood lock mechanism 14 is disposed at a vehicle width-direction center portion 12A of a front end edge portion of a hood 12 of an automobile body 10.

As shown in FIG. 1, the hood (bonnet) 12 is configured by a hood outer panel 16, which configures a vehicle body outer side surface of the hood 12, and a hood inner panel 18, which is disposed at the inner side (undersurface side) of the hood outer panel 16.

A swollen portion 18B (rear-side attachment portion of a lock reinforcement) that swells downward with respect to the vehicle body is formed at a position in the hood inner panel 18 separated by a predetermined distance from a front end portion 18A towards the vehicle body rear. The swollen portion 18B is formed along the vehicle width direction. The swollen portion 18B has a substantial "U" shape that opens upward with respect to the vehicle body when seen from the side, and includes a front slanted portion 18D, a bottom portion 18C and a rear slanted portion 18E.

A striker body 20 (hood lock striker) of the hood lock mechanism 14 is fixed, via a base plate 22, to a lower wall portion 24A of a lock reinforcement 24. Also, a front end edge portion 24B of the lock reinforcement 24 is joined to a front end edge portion 16A of the hood outer panel 16, and a slanted wall 24C that extends upward and rearward with respect to the vehicle body is formed at a rear side of the lower wall portion 24A of the lock reinforcement 24. A flange 24D is formed facing the vehicle body rear at a rear end edge portion of the slanted wall 24C, and the flange 24D is joined to a lower surface of the bottom portion 18C of the swollen portion 18B of the hood inner panel 18.

Namely, the hood inner panel 18 blocks off the open portion of the lock reinforcement 24, so that a front side bead 28 (closed cross-sectional structure) serving as a closed cross-sectional structure extending in the vehicle width direction is formed by the lock reinforcement 24 and the hood inner panel 18.

Thus, the swollen portion 18B of the hood inner panel 18 serves as the rear-side attachment portion of the lock reinforcement 24, and the flange 24D of the lock reinforcement 24 is largely separated from the hood outer panel 16 in the vehicle body vertical direction (separation distance H3).

Also, a cut-and-raised portion 30 having a predetermined width in the vehicle width direction is formed at a predetermined interval in the vehicle width direction at the front slanted portion 18D of the swollen portion B serving as the rear-side attachment portion of the lock reinforcement 24, and a top portion 30A of the cut-and-raised portion 30 is adhered with an adhesive 32 to the hood outer panel 16.

Next, the action of the present embodiment will be described.

In the present embodiment, the rigidity of the hood 12 can be secured by the front side bead 28 formed at the front end portion of the hood 12 by the hood inner panel 18 and the lock reinforcement 24. For this reason, it is not necessary to separately use, as in the comparative example shown in FIG. 4, a reinforcement panel 104 to block off an opening at the upper portion of a lock reinforcement 102 disposed at the front end portion of a hood 12.

Also, in the present embodiment, the rear-side attachment portion of the hood inner panel 18 to which is joined the flange 24D serves as the swollen portion 18B that swells downward with respect to the vehicle body. The flange 24D, which has another part of the attachment portion to the vehicle body, of the lock reinforcement 24 is largely separated from the hood outer panel 16 in the vehicle body vertical direction (separation distance H3). Thus, as shown in FIG. 1, when a collision body S collides with the hood 12 from above the vehicle body rear-side attachment portion of the lock reinforcement 24, the hood outer panel 16 is easily deformed due to the presence of a space 19 between the hood outer panel 16 and the bottom portion 18C of the swollen portion 18B, so that an excessive reaction force does not arise at the early stage of the collision.

Figure 3:
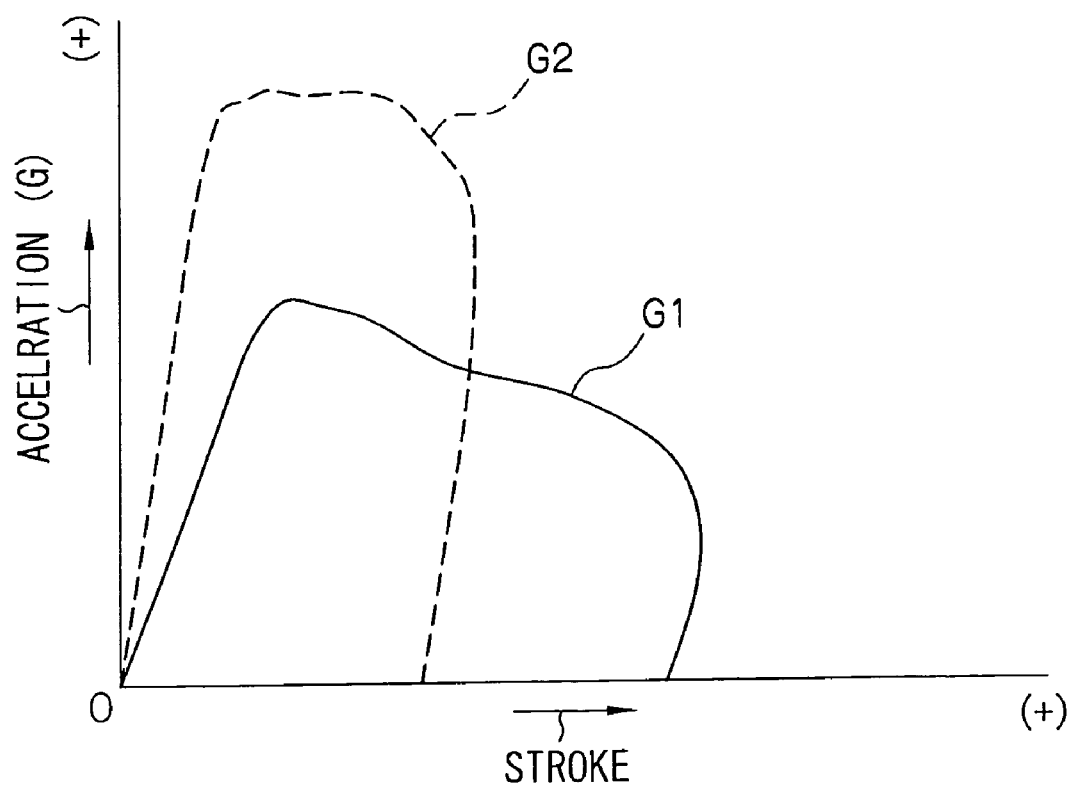
FIG. 3 is a graph showing the relation between the stroke and acceleration of a collision body in the vehicular hood structure.

For this reason, as shown in FIG. 3, the change in an acceleration G1 with respect to a form stroke of the collision body S in the present embodiment becomes more gradual at the start of the early stage of the collision in comparison to the change in an acceleration G2 with respect to the stroke of the collision body S in the comparative example of FIG. 4, so that the shock of the collision body S can be alleviated.

Thus, in the present embodiment, hood rigidity can be secured and the shock of a collision body can be alleviated without increasing the number of parts.

Also, in the present embodiment, the cut-and-raised portion 30 having a predetermined width in the vehicle width direction is formed at the front slanted portion 18D of the swollen portion 18B serving as the rear-side attachment portion of the lock reinforcement 24, and the top portion 30A of the cut-and-raised portion 30 is fixed with the adhesive 32 to the hood outer panel 16. For this reason, the number of joints between the hood inner panel 18 and the hood outer panel 16 is increased and the torsional rigidity of the hood 12 can be improved.

The invention may also be configured so that the deformation load of the front slanted portion 18D is controlled by forming a hole, slit, bead or step in the front slanted portion 18D of the hood inner panel 18 above the lock reinforcement 24. Also, a separate panel with a thinner panel thickness than that of the site at the rear side may be used at the site in front of the bottom portion 18C of the swollen portion 18 of the hood inner panel 18, and both may be joined. Also, the panel thickness of the site in front of the bottom panel 18C of the swollen portion 18B of the hood inner panel 18 may be made thinner in comparison to the site at the rear side by a tailored blank.

Next, a second embodiment of the vehicular hood structure of the invention will be described in accordance with FIG. 5.

The same reference numerals will be given to members that are the same as those of the first embodiment, and description of those same members will be omitted.

Figure 5:
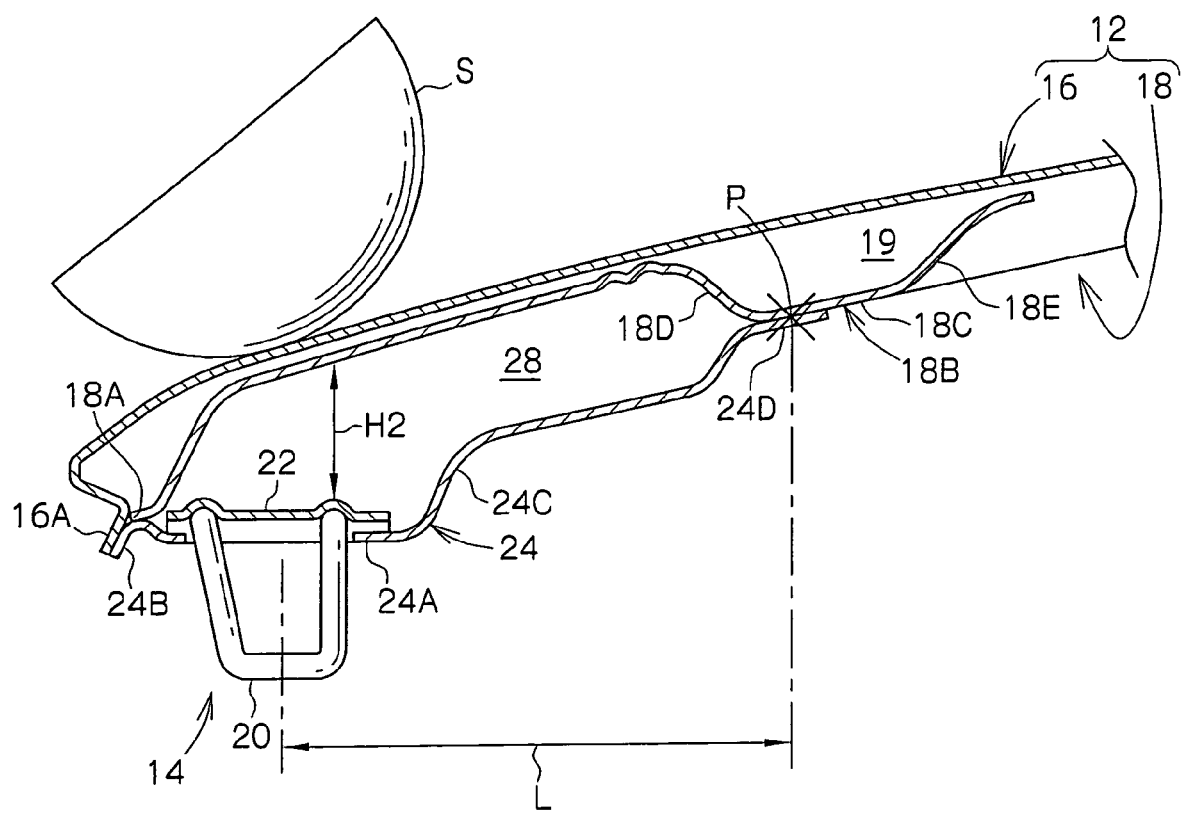
FIG. 5 is a cross-sectional view corresponding to FIG. 1 showing a vehicular hood structure pertaining to a second embodiment of the invention.

As shown in FIG. 5, in the present embodiment, the front side bead 28 formed by the lock reinforcement 24 and the hood inner panel 18 extends towards the rear of the vehicle body in the configuration of the first embodiment. For this reason, a distance L in the front-rear direction between a front-rear direction center portion of the striker body 20 of the hood lock mechanism 14 and a welding point P between the swollen portion 18B and the flange 24D is set to be at least 150 mm (L≧150 mm), and the distance L is at least twice a maximum distance H2 in the vertical direction between the hood inner panel 18 and the striker body 20 (L≧2H2).

Next, the action of the present embodiment will be described.

In the present embodiment, in addition to the action and effects of the first embodiment, the distance L in the front-rear direction between the front-rear direction center portion of the striker body 20 of the hood lock mechanism 14 and the welding point P between the swollen portion 18B and the flange 24D is set to be at least 150 mm (L≧150 mm), and the distance L is at least twice the maximum distance H2 in the vertical direction between the hood inner panel 18 and the striker body 20 (L≧2H2). As a result, when the collision body S strikes the hood 12 from above the striker body 20, a torque length L centered on the striker body 20 becomes longer. For this reason, the site of the hood 12 at which the collision body S has collided easily rotates downward starting at the welding point P. Thus, the shock alleviation performance is further improved.

Next, a third embodiment of the vehicular hood structure of the invention will be described in accordance with FIGS. 6 to 8.

The same reference numerals will be given to members that are the same as those of the first embodiment, and description of those same members will be omitted.

Figure 6:
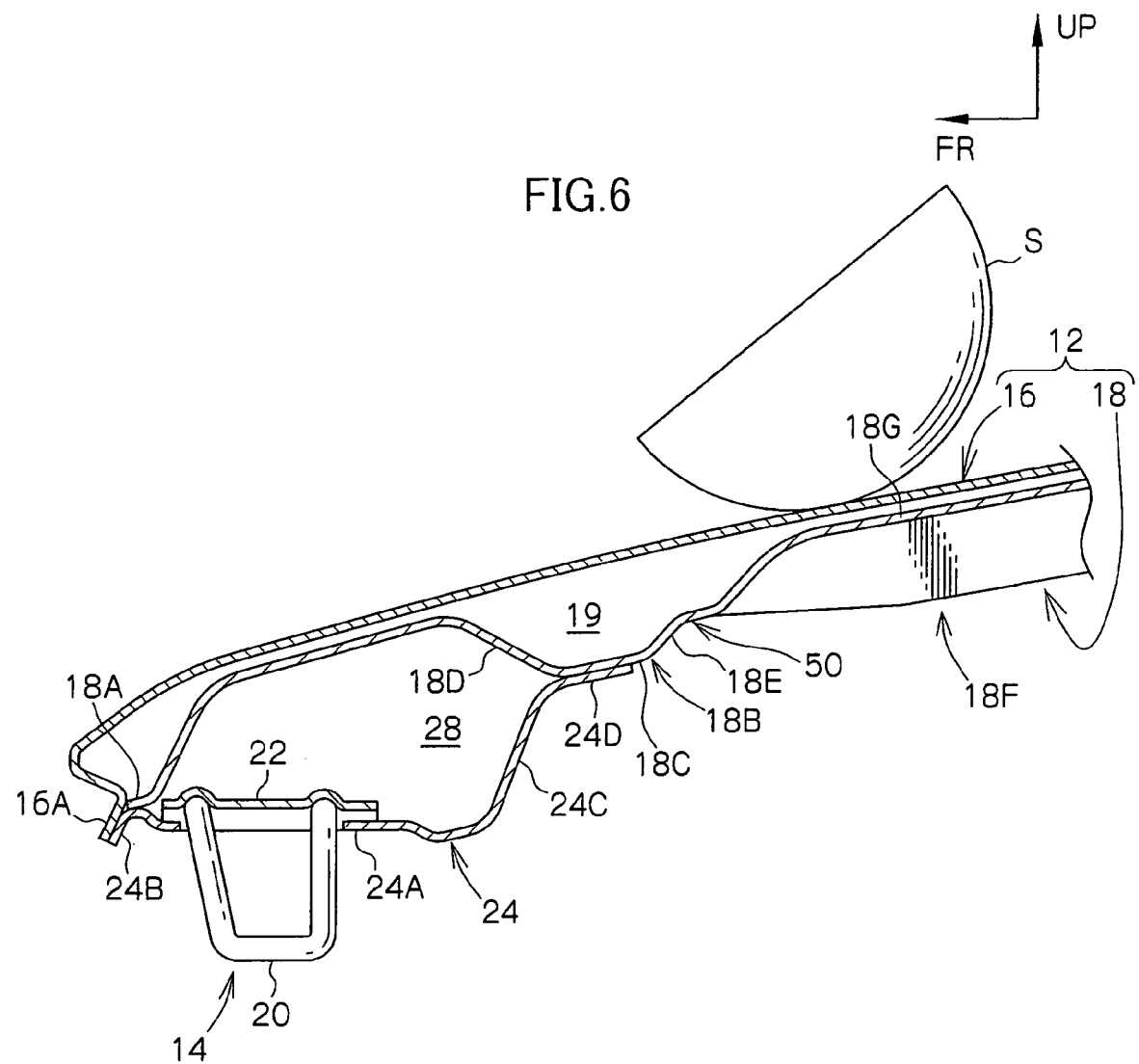
FIG. 6 is a cross-sectional view corresponding to FIG. 1 showing a vehicular hood structure pertaining to a third embodiment of the invention.

As shown in FIG. 6, in the present embodiment, a stepped portion 50 that curves upward with respect to the vehicle body is formed along the vehicle width direction in the rear slanted portion 18E of the swollen portion 18B formed in the hood inner panel 18.

Thus, when the collision body S collides with the hood 12 from above a common portion 18F nearer the rear of the vehicle body than the swollen portion 18B of the hood inner panel 18, the stepped portion 50, which is between the common portion 18F and the site above the lock reinforcement 24, is locally deformed.

Figure 7:
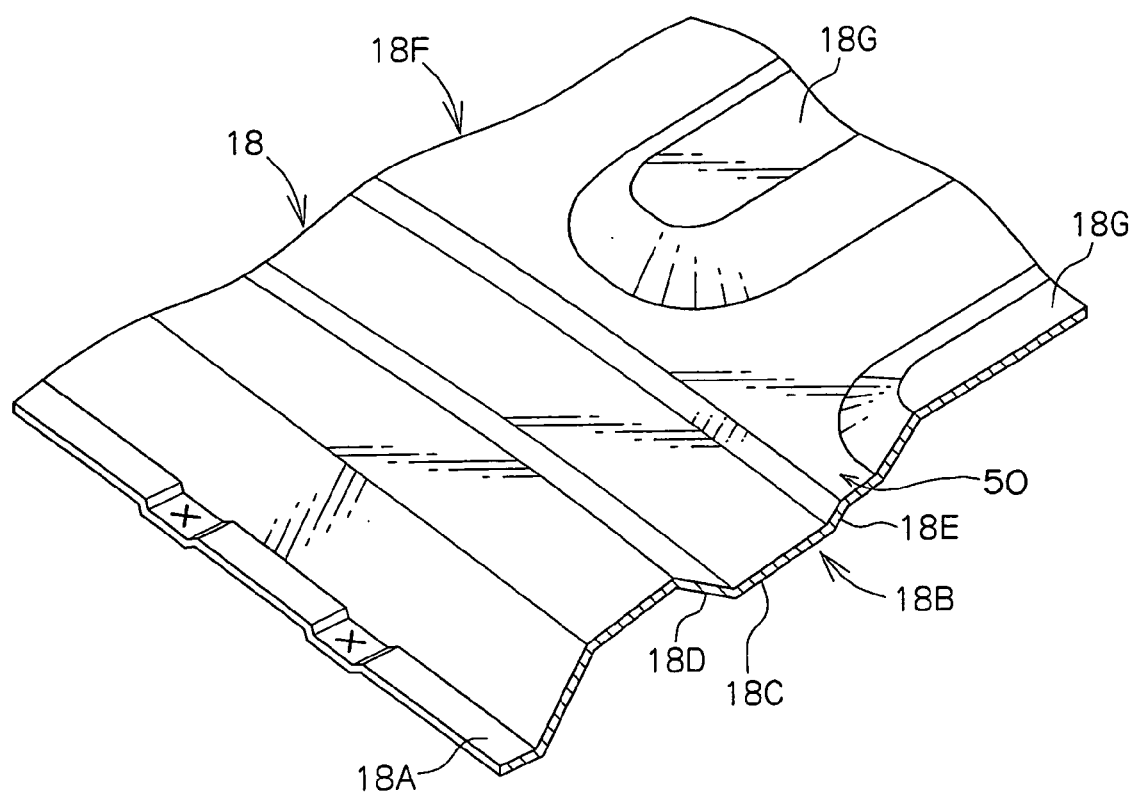
FIG. 7 is a perspective view, seen diagonally from the front of the vehicle body, showing a hood inner panel of the vehicular hood structure pertaining to the third embodiment of the invention.

As shown in FIG. 7, the hood inner panel 18 of the present embodiment is a so-called double structure type, and a convex portion 18G that swells upward with respect to the vehicle body is formed along the vehicle body front-rear direction in the common portion 18F of the hood inner panel 18.

Next, the action of the present embodiment will be described.

In the present embodiment, in addition to the action and effects of the first embodiment, the stepped portion 50 that curves upward with respect to the vehicle body is formed along the vehicle width direction in the rear slanted portion 18E of the swollen portion 18B formed in the hood inner panel 18. Thus, when the collision body S collides with the hood 12 from above the common portion 18F nearer the rear of the vehicle body than the swollen portion 18B (rear-side attachment portion) of the hood inner panel 18, the stepped portion 50, which is between the common portion 18F and the site above the lock reinforcement 24, is locally deformed. As a result, when the site of the hood at which the collision body S has collided is deformed, the influence of the lock reinforcement 24 can be alleviated.

Figure 8:
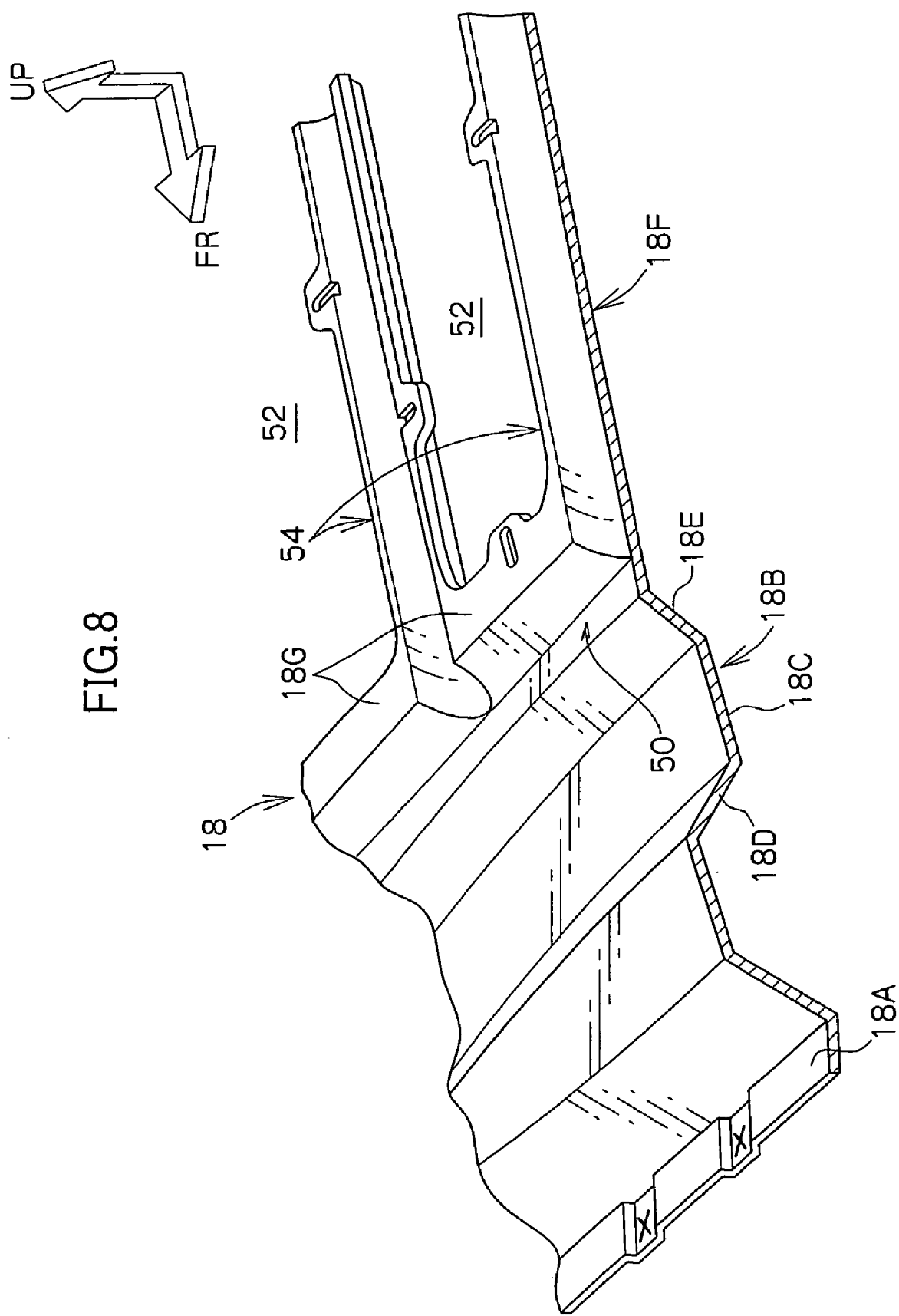
FIG. 8 is a perspective view, seen diagonally from the front of the vehicle body, showing a hood inner panel of a vehicular hood structure pertaining to a modified example of the third embodiment of the invention.

In the present embodiment, as shown in FIG. 7, the hood inner panel 18 of the present embodiment was a so-called double structure type, but as shown in FIG. 8, plural cutouts 52 may be formed in the hood inner panel 18 in the vehicle body front-rear direction, so that a so-called beam type is formed where beams 54 are formed between adjacent cutouts 52.

Next, a fourth embodiment of the vehicular hood structure of the invention will be described in accordance with FIGS. 9 to 11.

The same reference numerals will be given to members that are the same as those of the first embodiment, and description of those same members will be omitted.

Figure 9:
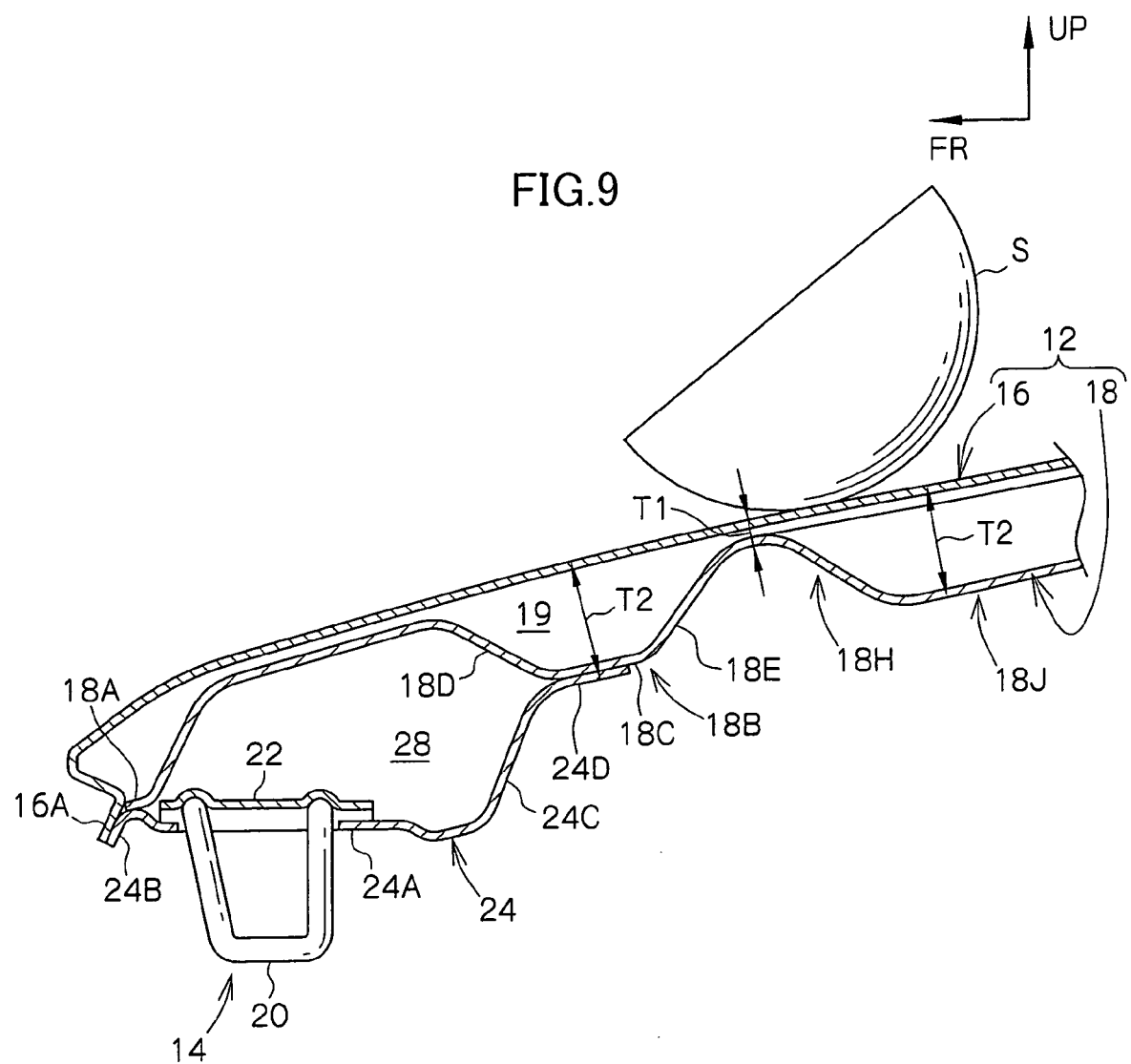
FIG. 9 is a cross-sectional view corresponding to FIG. 1 showing a vehicular hood structure pertaining to a fourth embodiment of the invention.

As shown in FIG. 9, in the present embodiment, a convex portion 18H that is upwardly convex with respect to the vehicle body near the hood outer panel 18 is formed along the vehicle width direction adjacent to the rear side of the swollen portion 18B formed in the hood inner panel 18, and a thickness T1 of the hood 12 at the top portion of this convex portion 18H is thinner than a panel thickness T2 of other sites.

Thus, when the collision body S collides with the hood 12 from above a common portion 18J nearer the rear of the vehicle body than the convex portion 18H of the hood inner panel 18, the convex portion 18H, which is between the common portion 18J and the site above the lock reinforcement 24, is locally deformed.

Figure 10:
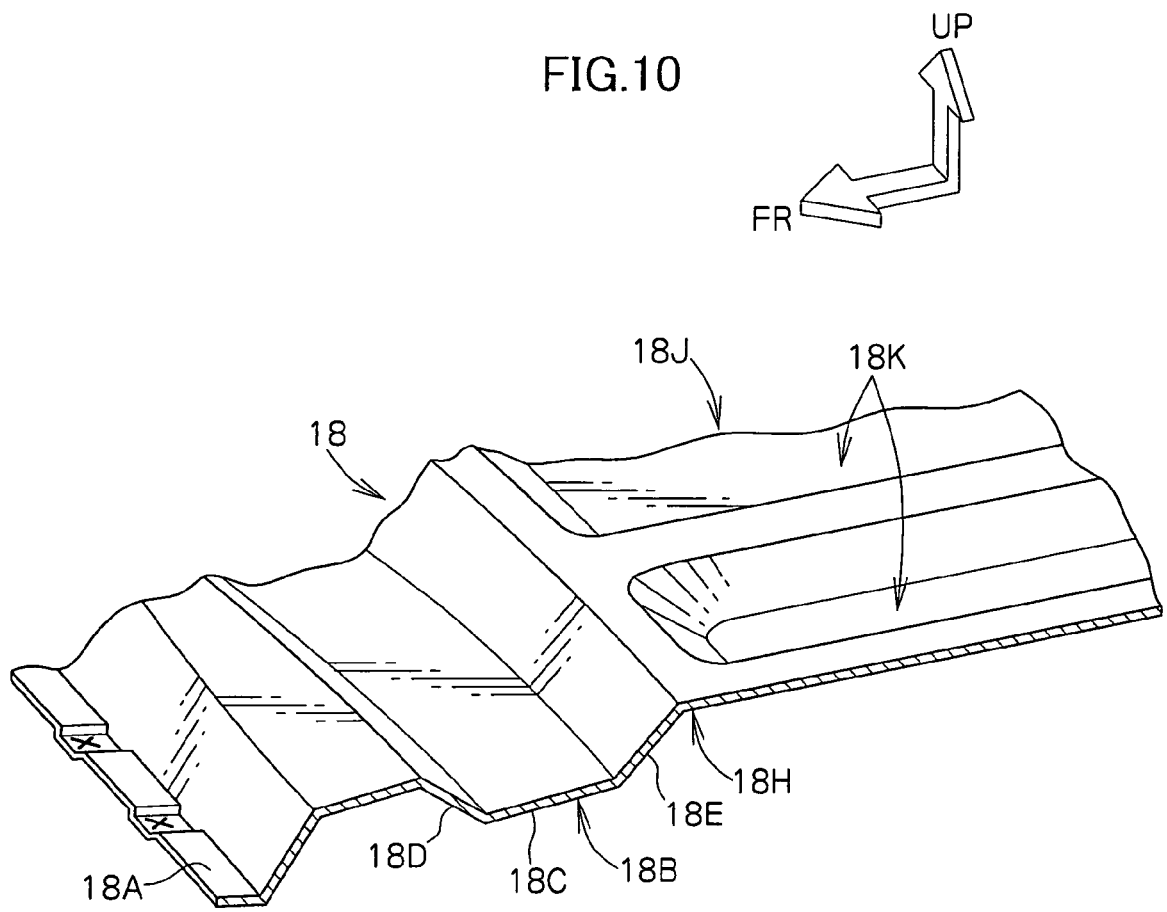
FIG. 10 is a perspective view, seen diagonally from the front of the vehicle body, showing a hood inner panel of the vehicular hood structure pertaining to the fourth embodiment of the invention.

As shown in FIG. 10, the hood inner panel 18 of the present embodiment is a so-called double structure type, and concave portions 18K that are downwardly concave with respect to the vehicle body are formed along the vehicle body front-rear direction in the common portion 18J of the hood inner panel 18.

Next, the action of the present embodiment will be described.

In the present embodiment, in addition to the action and effects of the first embodiment, the convex portion 18H that is upwardly convex with respect to the vehicle body near the hood outer panel 18 is formed along the vehicle width direction adjacent to the rear side of the swollen portion 18B formed in the hood inner panel 18. As a result, when the collision body S collides with the hood 12 from above the common portion 18J nearer the rear of the vehicle body than the convex portion 18H of the hood inner panel 18, the convex portion 18H, which is between the common portion 18J and the site above the lock reinforcement 24, is locally deformed. For this reason, when the site of the hood at which the collision body S has collided is deformed, the influence of the lock reinforcement 24 can be alleviated.

Figure 11:
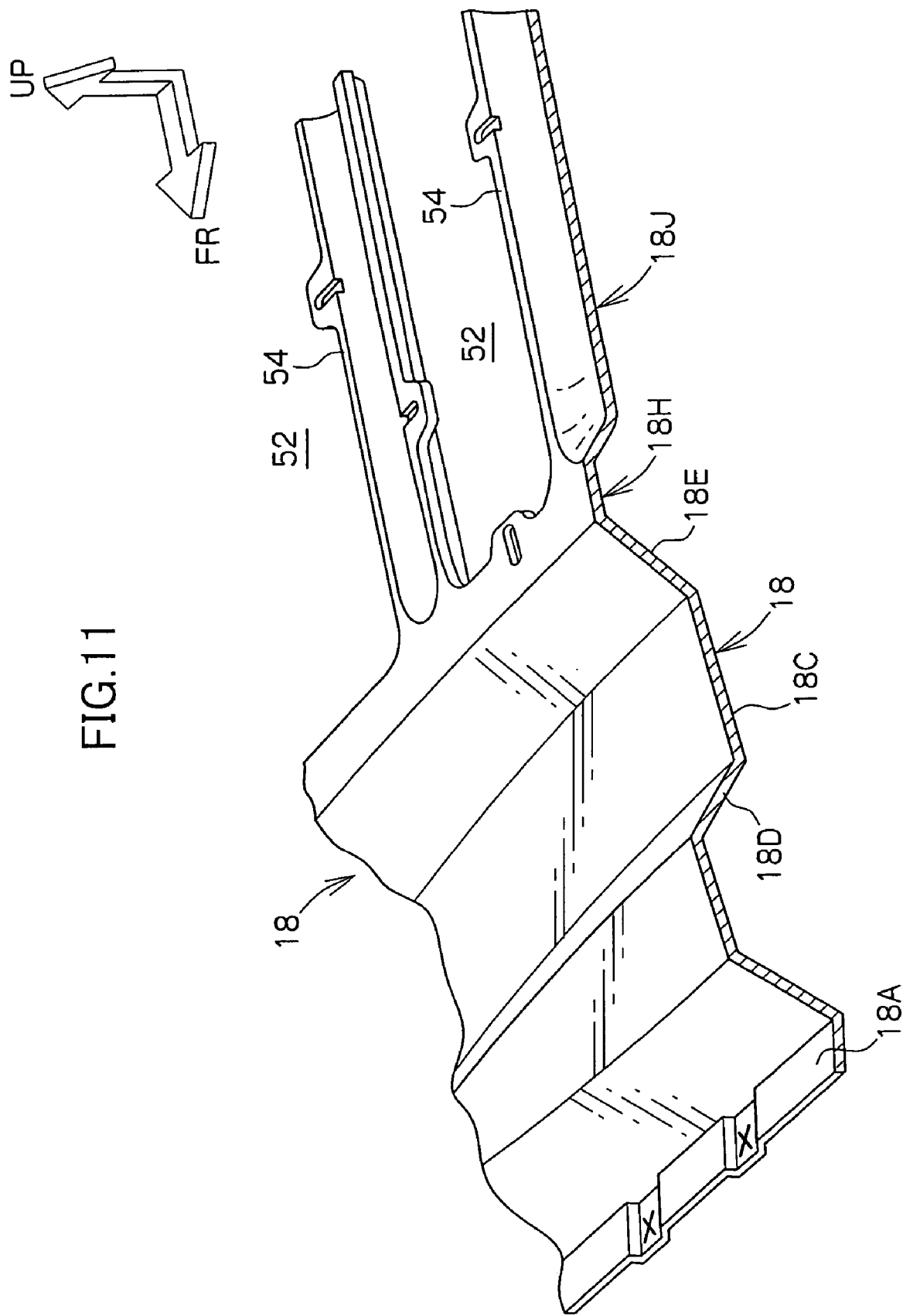
FIG. 11 is a perspective view, seen diagonally from the front of the vehicle body, showing a hood inner panel of a vehicular hood structure pertaining to a modified example of the fourth embodiment of the invention.

In the present embodiment, as shown in FIG. 10, the hood inner panel 18 of the present embodiment was a so-called double structure type, but as shown in FIG. 11, plural cutouts 52 may be formed in the hood inner panel 18 in the vehicle body front-rear direction, so that a so-called beam type is formed where beams 54 are formed between adjacent cutouts 52.

Figure 12:
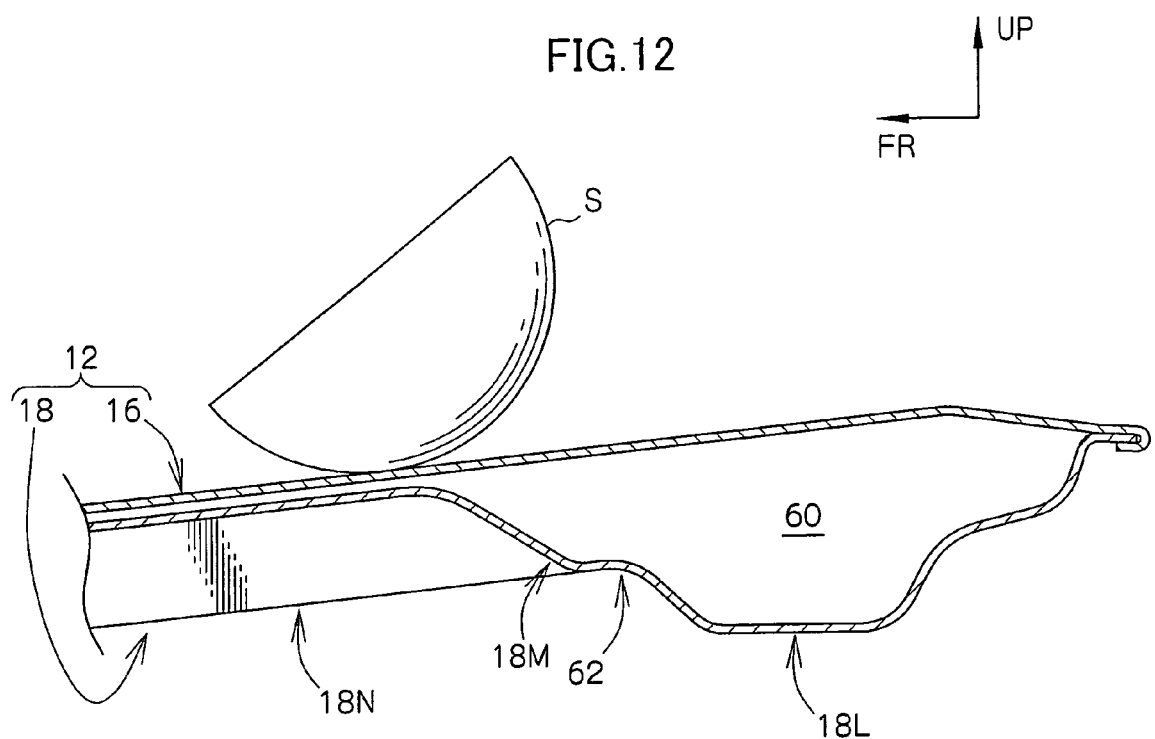
FIG. 12 is a side cross-sectional view showing a hood rear end portion of a vehicular hood structure pertaining to a fifth embodiment of the invention.

Next, a fifth embodiment of the vehicular hood structure of the invention will be described in accordance with FIG. 12.

The same reference numerals will be given to members that are the same as those of the first embodiment, and description of those same members will be omitted.

In the present embodiment, a swollen portion 18L that swells downward with respect to the vehicle body is formed in the rear end portion of the hood inner panel 18 of the hood 12, and a rear side beam 60 that extends in the vehicle width direction is formed by the swollen portion 18L and the rear end portion of the hood outer panel 16. The rear side beam 60 is disposed at the rear end edge portion of the hood 12 for a cowl seal.

A stepped portion 62 that curves upward with respect to the vehicle body is formed along the vehicle width direction in a front slanted portion 18M of the swollen portion 18L formed in the hood inner panel 18.

Thus, when the collision body S collides with the hood 12 from above a common portion 18N nearer the front of the vehicle body than the rear side beam 60, the stepped portion 62, which is between the common portion 18N and the rear side beam 60, is locally deformed.

Next, the action of the present embodiment will be described.

In the present embodiment, the stepped portion 62 that curves upward with respect to the vehicle body is formed along the vehicle width direction in the front slanted portion 18M of the swollen portion 18L formed in the hood inner panel 18. As a result, when the collision body S collides with the hood 12 from above the common portion 18N nearer the front of the vehicle body than the rear side beam 60, the stepped portion 62, which is between the common portion 18N and the rear side beam 60, is locally deformed. For this reason, when the site of the hood at which the collision body S has collided is deformed, the influence of the rear side beam 60 can be alleviated.

Thus, in the present embodiment, the rigidity of the hood 12 can be secured without increasing the number of parts, and the shock of the collision body S can be alleviated when a collision body S with a light mass collides near the rear end portion of the hood 12 in a case where the vehicle body is small and the position of the hood 12 is low or in a case where the front-rear length of the hood 12 is short.

Next, a sixth embodiment of the vehicular hood structure of the invention will be described in accordance with FIG. 13.

The same reference numerals will be given to members that are the same as those of the fifth embodiment, and description of those same members will be omitted.

Figure 13:
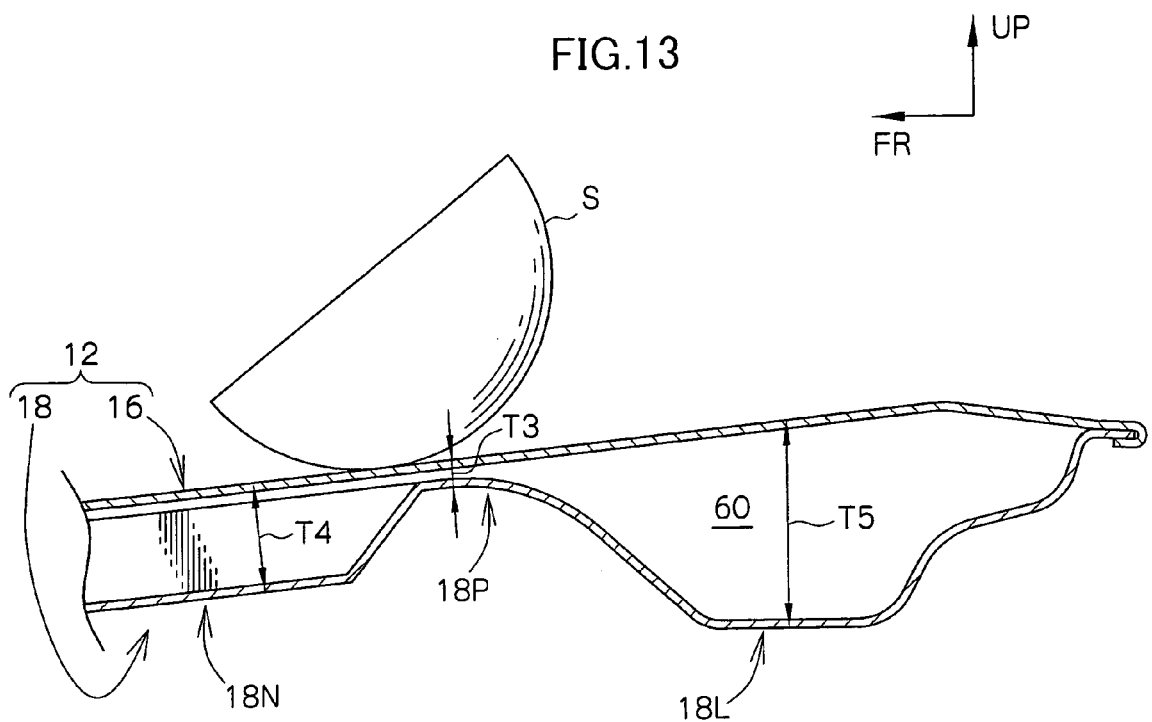
FIG. 13 is a side cross-sectional view showing a hood rear end portion of a vehicular hood structure pertaining to a sixth embodiment of the invention.

As shown in FIG. 13, in the present embodiment, a convex portion 18P that is upwardly convex with respect to the vehicle body near the hood outer panel 16 is formed adjacent to the front side of the swollen portion 18L formed in the hood inner panel 18, and a thickness T3 of the hood 12 at this convex portion 18P is thinner than a thickness T4 of the hood 2 at the common portion 18N and a thickness T5 of the hood 12 at the rear side beam 60.

Thus, when the collision body S collides with the hood 12 from above the common portion 18N nearer the front of the vehicle body than the rear side beam 60, the convex portion 18P, which is between the common portion 18N and the rear side beam 60, is locally deformed.

Next, the action of the present embodiment will be described.

In the present embodiment, in addition to the action and effects of the first embodiment, the convex portion 18P that is upwardly convex with respect to the vehicle body near the hood outer panel 16 is formed adjacent to the front side of the swollen portion 18L formed in the hood inner panel 18. As a result, when the collision body S collides with the hood 12 from above the common portion 18N nearer the front of the vehicle body than the rear side beam 60, the convex portion 18P, which is between the common portion 18N and the rear side beam 60, is locally deformed. For this reason, when the site of the hood at which the collision body S has collided is deformed, the influence of the rear side beam 60 can be alleviated.

Thus, in the present embodiment, the rigidity of the hood 12 can be secured without increasing the number of parts, and the shock of the collision body S can be alleviated when a collision body S with a light mass collides near the rear end portion of the hood 12 in a case where the vehicle body is small and the position of the hood 12 is low or in a case where the front-rear length of the hood 12 is short.

In a case where the vehicle body is large and the position of the hood 12 is high or in a case where the front-rear length of the hood 12 is long, the invention may be configured so that, as shown in FIG. 14, a stepped portion or a projecting portion is not formed along the rear side beam 60 of the hood inner panel 18. By configuring the invention as shown in FIG. 14, it becomes difficult for local deformation to arise between the rear side beam 60 and the common portion 18N and the amount of absorbed energy at the time of a primary collision (when a collision body contacts the hood 12) can be sufficiently secured when a collision body S with a large mass collides with the hood 12 near the rear side beam 60. For this reason, a secondary collision (when the hood 12 collides with a part inside the hood or the vehicle body) of the collision body can be alleviated.

Usually, the wrap-around distance (WAD) of the hood 12 is 1500 m to 1700 mm, and a collision body with a light mass easily collides with a site in front of that, and a collision body with a heavy mass easily collides with a site behind that. Thus, at the site at the front side where the WAD of the hood 12 is smaller than 1500 mm, the stepped portion 62 described in the fifth embodiment is formed in side beams formed along the vehicle body front-rear direction at both vehicle width-direction end portions of the hood 12, and at the site at the rear side where the WAD is larger than 1700 mm, the stepped portion 62 shown in FIG. 12 is not formed in the side beams. Also, the shape of the stepped portion may be gradually changed with respect to the site where the WAD of the hood 12 is 1500 to 1700 mm. As a result, error can be effectively reduced in correspondence to differences in the mass of collision bodies even at both vehicle width-direction end portions of the hood 12.

The invention has been described in detail above in regard to specific embodiments, but the invention is not limited to these embodiments. That various other embodiments are also possible within the scope of the invention will be apparent to those skilled in the art.

What is claimed is:

1. A vehicular hood structure including:
    a lock reinforcement that is disposed at a lower surface side of a hood inner panel at a predetermined interval away from the hood inner panel and which forms a closed cross-sectional structure with the hood inner panel; and
    a rear-side attachment portion that is formed in the hood inner panel and to which is fixed a vehicle body rear-side attachment portion of the lock reinforcement,
    wherein the rear-side attachment portion formed in the hood inner panel forms a swollen portion that swells further downward with respect to the vehicle body than other sites of the hood inner panel and the lock reinforcement is separated from the hood inner panel.

2. The vehicular hood structure of claim 1, further including a cut-and-raised portion that is formed in part of the rear-side attachment portion of the hood inner panel and is joined to a hood outer panel.

3. The vehicular hood structure of claim 1, wherein a stepped portion is formed in the rear-side attachment portion of the hood inner panel.

4. The vehicular hood structure of claim 1, wherein a distance in a front-rear direction between the rear-side attachment portion of the hood inner panel and a hood lock striker is set to be at least twice a distance in a vertical direction between the hood inner panel and the hood lock striker.

5. The vehicular hood structure of claim 2, wherein the hood inner panel includes a convex portion that is upwardly convex with respect to the vehicle body, is formed along the vehicle width direction, and is adjacent to a front side of the swollen portion, and a common portion formed at a front side of the convex portion,
    wherein the thickness of the hood at the convex portion is thinner than the thickness of the hood at the common portion.

6. The vehicular hood structure of claim 2, wherein the hood inner panel includes a convex portion that is upwardly convex with respect to the vehicle body, is formed along the vehicle width direction, and is adjacent to a rear side of the swollen portion, and a common portion formed at a front side of the convex portion,
    wherein the thickness of the hood at the convex portion is thinner than the thickness of the hood at other sites.

7. The vehicular hood structure of claim 6, wherein the hood inner panel has a double structure and includes a common portion formed adjacent to the convex portion, and the common portion is disposed with at least one concave portion that is downwardly concave with respect to the vehicle body and is formed along the vehicle body front-rear direction.

8. The vehicular hood structure of claim 6, wherein the hood inner panel includes plural cutout portions formed along the vehicle body front-rear direction, with beams being formed between the cutout portions.

9. The vehicular hood structure of claim 3, wherein the swollen portion includes a rear slanted portion, and the stepped portion curves upward with respect to the vehicle body at the rear slanted portion and is formed along the vehicle width direction.

10. The vehicular hood structure of claim 3, wherein the swollen portion includes a front slanted portion, and the stepped portion curves upward with respect to the vehicle body at the rear slanted portion and is formed along the vehicle width direction.

* * * * *